Patented Sept. 12, 1922.

1,428,521

UNITED STATES PATENT OFFICE.

CHARLES V. BACON, OF MAHWAH, NEW JERSEY.

PROCESS OF RECOVERING IRON OXIDE AND OTHER PRODUCTS FROM SPENT IRON SLUDGE.

No Drawing. Application filed January 2, 1920. Serial No. 348,775.

*To all whom it may concern:*

Be it known that I, CHARLES V. BACON, a citizen of the United States, residing at Mahwah, county of Bergen, and State of New Jersey, have invented a new and useful Improvement in Processes of Recovering Iron Oxide and Other Products from Spent Iron Sludge, of which the following is a specification.

This invention relates to a process for utilizing the spent iron sludge, commercially known as aniline reduction sludge, reductor sludge etc., which is obtained as a by-product from the manufacture of aniline, nitrobenzene, metaphenylene, metaphenyldiamine and such other products that yield a product which is usually magnetic and essentially comprises free or combined oxide of iron.

My investigations have led to the discovery that the aforesaid spent iron sludge, which heretofore has been either discarded as valueless or, when the ore market conditions permitted, converted by furnacing to iron sinter, is admirably adapted for the production of a high grade oxide of iron which is capable of serving as a buffing or polishing material, paint pigment or jeweler's rouge.

In carrying out my invention I preferably proceed as follows:

A sufficient weight of concentrated sulfuric acid between 50° and 70° Bé., for example 66° Bé., is gradually added, in a suitable mixing apparatus, to spent iron sludge to convert the same into a substantially dry mixture consisting essentially of ferrous and ferric sulfates, the reaction being, it is believed, represented by the following equation:

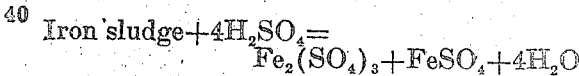

Iron sludge $+ 4H_2SO_4 = Fe_2(SO_4)_3 + FeSO_4 + 4H_2O$

The sulfates so obtained are then calcined for a sufficient time at a sufficiently high temperature to decompose the same into ferrous oxide and a gaseous mixture of sulfur dioxide and trioxid as represented substantially by the following equations:

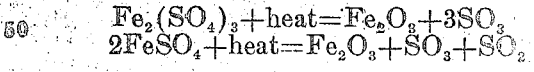

$Fe_2(SO_4)_3 + heat = Fe_2O_3 + 3SO_3$
$2FeSO_4 + heat = Fe_2O_3 + SO_3 + SO_2$ The decomposition of the said mixed sulfates occurs very readily, usually requiring but a very few minutes, say five to ten minutes. Furthermore, the heated charge will exist as a coarse grained powder, during the calcination, which lends itself very readily to roasting and does not melt down and accumulate on the furnace lining as is the case when acid of but 30° Bé. or thereabouts is employed.

By employing the foregoing process by which the concentration of the acid employed is such as to prevent the formation of an aqueous paste from which it is not necessary to evaporate the excess water before calcination, it is possible to not only, as previously stated, avoid the injury to the furnace or retort and to the end product, but also to effect the economical production of the desired iron oxide in the form of a brilliant red pigment which can be readily ground with oil and thereby produce an excellent oil paint therefrom; or if desired such oxide can be employed dry as a buffing or polishing material or jeweler's rouge.

Though I employ sulfuric acid in the form of ordinary commercial acid or sludge acid of the proper concentration, it is obvious that without departing from the spirit of my invention, it may be desirable to add smaller quantities of other acids depending on the character of the product desired, as such acid if present in small quantities would not prevent the transformation of the iron sludge to a mixture consisting essentially of ferric and ferrous sulfates.

Having thus described my invention, what I claim and desire to secure by Letters Patent of the United States is:

1. The process which consists in subjecting iron sludge, comprising essentially rather impure iron oxide, to the action of concentrated sulfuric acid of a specific gravity substantially exceeding 50° Bé., heating the resultant sulfate compounds to a sufficiently elevated temperature and for a sufficient time to decompose the same into oxy sulfur-acid gases and iron oxide and separately recovering such iron oxide.

2. The process which consists in subjecting iron sludge, comprising essentially rather impure iron oxide, to the action of concentrated sulfuric acid of a specific gravity substantially exceeding 55° Bé., heating the resultant sulfate compounds to a sufficiently elevated temperature and for a sufficient time to decompose the same into oxy sulfur-acid gases and iron oxide and separately recovering such iron oxide.

3. The process which consists in subjecting magnetic iron sludge, comprising essentially rather impure iron oxide, to the action of concentrated sulfuric acid sufficient to convert the same into a substantially dry mixture consisting essentially of ferrous and ferric sulphates, heating the resultant sulfate compounds to a sufficiently elevated temperature and for a sufficient time to decompose the same into oxy sulfur-acid gases and iron and separately recovering such iron oxide.

4. The process which consists in subjecting iron sludge, comprising essentially rather impure iron oxide, to the action of substantially a combining weight of concentrated sulfuric acid of a specific gravity substantially exceeding 50° Bé., heating the resultant sulfate compounds to a sufficiently elevated temperature and for a sufficient time to decompose the same into oxy sulfur-acid gases and iron oxide and separately recovering such iron oxide.

5. The process which consists in subjecting iron sludge, comprising essentially rather impure iron oxide, to the action of substantially a combining weight of concentrated sulfuric acid of a specific gravity substantially exceeding 55° Bé., heating the resultant sulfate compounds to a sufficiently elevated temperature and for a sufficient time to decompose the same into oxy sulfur-acid gases and iron oxide and separately recovering such iron oxid.

6. The process which consists in subjecting iron sludge, comprising essentially rather impure iron oxide, to the action of substantially a combining weight of concentrated sulfuric acid of a specific gravity substantially ranging between 60° and 70° Bé., heating the resultant sulfate compounds to a sufficiently elevated temperature and for a sufficient time to decompose the same into oxy sulfur-acid gases and iron oxide and separately recovering such iron oxide.

7. The process which consists in subjecting iron sludge comprising essentially iron oxide to the action of concentrated sulfuric acid sufficient to convert the same into a substantially dry mixture consisting essentially of ferrous and ferric sulphates, heating the resultant sulfate compounds to a sufficiently elevated temperature and for a sufficient time to decompose the same into volatile oxy-sulfur compounds and iron and separately recovering such iron oxide.

Signed at New York city, in the county of Bergen and State of New York this 23rd day of December, 1919.

CHAS. V. BACON.